March 7, 1950 G. J. STREZYNSKI 2,500,101
CONCENTRATION OF ALBUMEN FROM WHEY
Filed Sept. 10, 1946
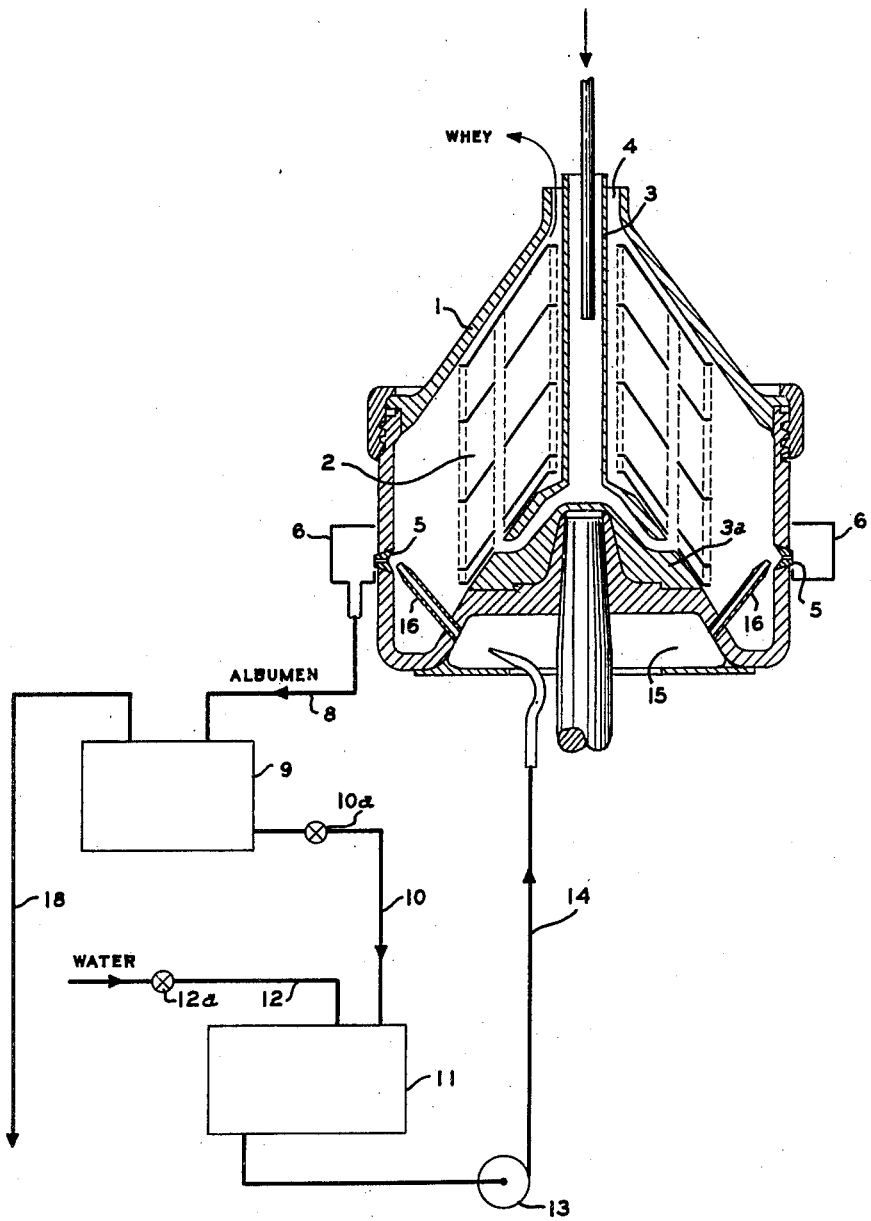
INVENTOR
GEORGE J. STREZYNSKI
BY
ATTORNEY Patented Mar. 7, 1950

2,500,101

UNITED STATES PATENT OFFICE 2,500,101

CONCENTRATION OF ALBUMEN FROM WHEY

George J. Strezynski, Chicago, Ill., assignor to The De Laval Separator Company, New York, N. Y., a corporation of New Jersey Application September 10, 1946, Serial No. 695,875

6 Claims. (Cl. 260—122)

This invention relates to the concentration of albumen from whey and more particularly to an improved method for this purpose in which the albumen is concentrated centrifugally and continuously in a form substantially free of sugar.

The new process may be used for treating various products containing an albuminous substance which is to be obtained in a concentrated form substantially free of sugar, but for illustrative purposes it will be described in connection with the treatment of milk whey used in the manufacture of cheese.

In the manufacture of cheese, it is common practice to centrifuge unclarified and precipitated whey containing about 1% of albumen by volume, so as to obtain as one of the separated constituents an albumen concentrate of about 50 percent of albumen by volume. In accordance with prior practices, the albumen concentrate resulting from the centrifuging contains a substantial quantity of sugar, in many cases as much as 6 percent by volume. This sugar is objectionable in the albumen concentrate, and it would be a distinct advantage in the subsequent processing of the albumen if its sugar content could be substantially reduced in the concentrating operation.

The present invention, therefore, is directed to the provision of an improved method by which the desired concentration of albumen is obtained by centrifuging the whey continuously, and at the same time the sugar content of the albumen concentrate is substantially reduced.

According to the invention, the precipitated whey is fed into a centrifugal bowl where albumen is continuously separated from the whey and discharged as the heavier constituent, which initially has an albumen concentration substantially lower than that desired in the final product, the whey being discharged from the inner portion of the bowl. At least part of the albumen discharge is then recycled to the peripheral portion of the centrifugal bowl, to increase the albumen concentration of the discharge to the desired value, part of the albumen discharge then being withdrawn at a rate such that the remainder when recycled will tend to maintain the albumen discharge at the desired concentration. However, before the recycled albumen is returned to the bowl, it is diluted with a sugar solvent of lower specific gravity than the albumen and in an amount sufficient to form a mixture of albumen and dilute sugar solution as heavier and lighter components, respectively. The mixture is then fed into the peripheral portion of the bowl, whereby the greater part of the sugar solution as a lighter component is displaced inwardly and discharged separately from the returned albumen constituent and preferably with the separated whey constituent. The returned albumen, after substantial separation from the dilute sugar solution, is discharged from the peripheral portion of the bowl along with albumen newly separated from the whey. Thus, in the normal operation of the process, the albumen withdrawn from the albumen discharge will be concentrated free of a substantial part of the usual sugar content, which will be discharged from the locus of centrifugal force separately from the albumen concentrate.

For a better understanding of the invention, reference may be had to the accompanying drawing, in which the single figure is a schematic view of a system suitable for practicing the invention.

Referring to the drawing, the system there shown comprises a centrifugal bowl 1 mounted for rotation on a vertical axis in a suitable frame and having a separating chamber 2 constituting a locus of centrifugal force which may be provided with the usual conical discs forming an initial separating zone. The feed to the separating chamber is effected through an axial tubular member 3, which may be a tubular shaft rotatable with the local bowl and having a distributor 3a at its lower end portion. The lighter constituent, separated in the separating zone between the discs in chamber 2, is displaced inwardly and discharged from the upper portion of the bowl through an outlet 4 near the bowl axis. The heavier separated constituent, which accumulates in the peripheral portion of the chamber, is discharged through outlets 5, which may be in the form of peripheral nozzles spaced around the bowl. The discharge from the nozzles is collected in a stationary cover or receiver 6.

A conduit 8 connects the receiver 6 to a decanting device 9 which, in turn, is connected by a conduit 10 to a mixing tank 11. The conduit 10 has a valve 10a which serves to regulate the rate of flow from the decanting device to the mixing tank. A supply pipe 12 for a solvent leads to the tank 11 and has a valve 12a by which the rate of flow of the solvent may be regulated. From the tank 11, the mixture is adapted to be delivered by a pump 13 through a return conduit 14 to an annular, inwardly facing recess 15 in the bottom of the bowl. The recess 15 communicates with flushing tubes 16 leading to the peripheral portion of chamber 2 near the discharge nozzles 5 and outside the initial separating zone.

In the practice of the process, unclarified precipitated whey, obtained from milk in any desired manner and containing, for example, about 1% of albumen by volume, is fed into the separating chamber 2 through the tubular member 3. In the initial separating zone of chamber 2, the albumen as the heavier constituent is separated from the whey and thrown outwardly, the separated whey being displaced inwardly and discharged through outlet 4. The separated albumen constituent or sludge, which accumulates in the peripheral portion of the chamber and is discharged through outlets 5, has a concentration which initially is substantially lower than that desired in the final product. For example, the initial albumen discharge may contain about 10% of albumen by volume, whereas the desired final concentration may be 50% of albumen by volume. Also, the initial albumen discharge will normally contain a substantial amount of sugar, for example, about 6% by volume.

The discharged albumen sludge is collected in the cover 6 and conveyed through conduit 8 to the decanting device 9, from which part of the albumen sludge, or all of it initially, is transferred through conduit 10 into the mixing tank 11. In the tank 11, the albumen sludge is mixed with a sugar solvent, preferably water, of a lower specific gravity than the albumen, the water being introduced through pipe 12 at a rate (controlled by valve 12a) at least sufficient to dissolve or substantially dilute all of the sugar content of the albumen sludge in the tank. As an example, equal parts by volume of water and albumen sludge may be delivered to the mixing tank. Thus, the sugar content of the sludge dissolves in or is diluted by the water, forming a mixture of albumen sludge and sugar solution as heavier and lighter components, respectively.

This mixture is delivered from tank 11 by pump 13 through conduit 14 into the recess 15 in the bowl. Due to the action of centrifugal force, the mixture is then conducted from recess 15 through tubes 16 to the peripheral portion of the separating chamber 2, that is, outside the zone in which the initial separation of the whey and the albumen sludge occurs. Since the sugar and water solution in the returned sludge is of lower specific gravity than the albumen, the solution is displaced inwardly in the chamber and discharged with the whey through outlet 4, it being understood that this inward movement of the sugar and water solution in the chamber effects a washing or scrubbing action on the outflowing albumen from the tubular member 3. The albumen sludge which is thus returned to the separating chamber and freed from the sugar solution, is discharged through outlets 5 along with albumen newly separated from the whey entering through tubular member 3.

Since the mixture of albumen sludge and sugar solution introduced through tubes 16 has a substantially higher albumen concentration than the feed from tubular member 3, it acts to increase the albumen concentration of the discharge through outlets 5, which causes, in turn, an increase in the albumen concentration of the mixture entering through tubes 16. This action is continued until the sludge discharge from outlets 5 attains the desired albumen concentration, for instance, 50% by volume. Albumen sludge is then withdrawn from the decanting device 9, as by means of a discharge pipe 18, at a rate such that the remainder, when mixed with the sugar solvent in tank 11 and returned through tubes 16, will maintain the sludge discharge at the desired albumen concentration. It will be apparent that the rate of feed through tubes 16 necessary to maintain this normal operating condition will depend upon the desired albumen concentration, the characteristics of the centrifuge, the characteristics and rate of feed of the whey, and also the rate at which the sugar solvent is introduced through pipe 12. By suitable adjustments of the valves 18a and 12a, the operating conditions may be easily varied to suit requirements.

The albumen sludge withdrawn from the system through pipe 18, in the normal operation of the process, will have the desired concentration and will be substantially free of sugar; that is, it will have only a slight trace of sugar from the newly separated albumen which is discharged from the bowl and which has not been recycled.

As an example of the application of the new process in normal operation, the precipitated whey containing about 1% of albumen by volume is fed into the bowl at a rate of 3000 gallons per hour, the concentrated sludge (about 50% of albumen by volume) is discharged at a rate of about 300 gallons per hour through outlets 5, and sludge is withdrawn from the decanting device 9 through pipe 18 at a rate of about 60 gallons per hour. The remainder of the sludge discharge is fed into tank 11 at a rate of about 240 gallons per hour where it is mixed with water fed through pipe 12 at substantially the same rate. Thus, the mixture of sludge and sugar solution is fed through tubes 16 at a rate of about 480 gallons per hour and with a concentration of about 25% of albumen by volume. The discharge of whey and sugar solution through outlet 4 will be at a rate of about 3180 gallons per hour. Without the recycling operation, with its attendant dissolving or diluting of the sugar content of the albumen sludge, the sludge discharge through outlets 5 would have a concentration of about 10% albumen by volume and would contain about 6% of sugar by volume, whereas in the new process the albumen sludge withdrawn from the system through pipe 18 has an albumen concentration of about 50% by volume and a sugar content of only about 2% by volume.

It is to be understood that in the process described in connection with the drawing, the whey has been partly evaporated before being fed into the separating chamber through the tubular member 3. Consequently, the incoming whey contains sugar which has precipitated out of solution and which is separated as solid particles with the albumen in the separating chamber 2. This undissolved sugar, except for the relatively small portion which may be removed from the system through pipe 18, is then completely dissolved and reduced to a dilute solution in the mixing tank 11. However, the invention may also be practiced with unevaporated whey in which all of the sugar is initially in solution when the whey is fed into the bowl. In the latter case, the proportion of water mixed with the albumen constituent in the tank 11 need not be as great in order to reduce the sugar content to a solution sufficiently dilute to be substantially separated out from the returned albumen in the bowl and discharged with the separated whey through outlet 4. It will also be understood that the water added in tank 11, in order to reduce the sugar content to a dilute solution as described, must itself be free of sugar, or at least sufficiently so to obtain this effect.

The new process may be practiced with a simple installation and is easily controlled. The recycling of the albumen sludge, after diluting its sugar content in the manner described, serves not only to increase and control the albumen concentration of the sludge discharge but also to greatly reduce the sugar content of the final product. Moreover, the sugar solvent added in the tank 11 also serves to wash the albumen sludge returned to the bowl, and the sugar solution entering through the tubes 16 serves to wash the newly separated albumen thrown outwardly in the separating chamber.

I claim:

1. A process for concentrating albumen, substantially free of sugar, from whey, which comprises feeding the whey into a locus of centrifugal force having an outer periphery and an initial separating zone and separating it in said zone into a whey constituent and an albumen constituent containing sugar, continuously discharging the separated albumen constituent from the peripheral portion of the locus and the separated whey constituent from the inner portion of the locus, withdrawing part of the albumen constituent from said albumen discharge at a rate such that the remainder, when diluted and returned to the peripheral portion of the locus as hereinafter provided, will tend to maintain the albumen discharge at a predetermined concentration, diluting said remainder with a sugar solvent of lower specific gravity than the albumen and in an amount sufficient to form a mixture of albumen and dilute sugar solution, returning said albumen and dilute sugar solution to the peripheral portion of said locus outside the separating zone while continuing to feed whey into the locus and separating the same, displacing the dilute sugar solution in the returned albumen constituent inwardly in said locus toward the whey discharge and away from the albumen discharge, discharging the returned albumen, with substantially lower sugar content than the initially separated albumen constituent, from the locus combined with albumen newly separated from the whey, and discharging said sugar solution from the locus separately from said albumen.

2. A process as defined in claim 1, in which the whey is partly evaporated before being fed into said locus, whereby said remainder of the albumen constituent contains sugar in precipitated form, said sugar solvent being added in an amount sufficient to dissolve all of the sugar content of said remainder.

3. A process as defined in claim 1, in which said sugar solution is discharged from the locus along with the separated whey constituent.

4. A process as defined in claim 1, comprising also the step of collecting said combined albumen discharge in a decanting zone from which said part of the albumen constituent is withdrawn.

5. A process as defined in claim 1, comprising also the step of collecting said remainder of the discharged albumen constituent in a mixing zone in which it is diluted with the sugar solvent.

6. A process as defined in claim 1, in which said sugar solvent is water.

GEORGE J. STREZYNSKI.

REFERENCES CITED

The following references are of record in the file of this patent:

UNITED STATES PATENTS

| Number | Name | Date |
| --- | --- | --- |
| 801,691 | Ramage | Oct. 10, 1905 |
| 2,097,531 | Peltzer | Nov. 2, 1937 |
| 2,186,037 | Peltzer | Jan. 9, 1940 |
| 2,316,807 | Peltzer | Apr. 20, 1943 |

OTHER REFERENCES

Belter et al., Industrial and Engineering Chemistry, vol. 36, (September 1944), pages 799-803.